United States Patent [19]

Ross

[11] 3,879,419
[45] Apr. 22, 1975

[54] S-(1,1-DIOXO-2,3-DIHYDRO-3-BENZOTHIENYL) PHOSPHOROTHIOATES

[75] Inventor: Frank Ross, Villa Park, Ill.

[73] Assignee: Velsicol Chemical Corporation, Chicago, Ill.

[22] Filed: Nov. 27, 1970

[21] Appl. No.: 93,420

[52] U.S. Cl. ............................. 260/330.5; 424/202
[51] Int. Cl. .............................................. C07d 63/08
[58] Field of Search ................................. 260/330.5

[56] References Cited
UNITED STATES PATENTS

| | | | |
|---|---|---|---|
| 3,106,565 | 10/1963 | Newallis | 260/332.1 |
| 3,288,808 | 11/1966 | Kilsheimer et al. | 260/330.5 |
| 3,428,655 | 2/1969 | Melton et al. | 260/330.5 |
| 3,468,909 | 9/1979 | Gough | 260/330.5 |
| 3,590,052 | 6/1971 | Barker | 260/327 |

OTHER PUBLICATIONS

Bordwell, et al., *Journal of the American Chemical Society*, Vol. 72, pages 1985 to 1988 (May 1950).

*Primary Examiner*—Henry H. Jiles
*Assistant Examiner*—C. M. S. Jaisle
*Attorney, Agent, or Firm*—Robert J. Schwarz; Dietmar H. Olesch

[57] ABSTRACT

This invention discloses new compounds of the formula

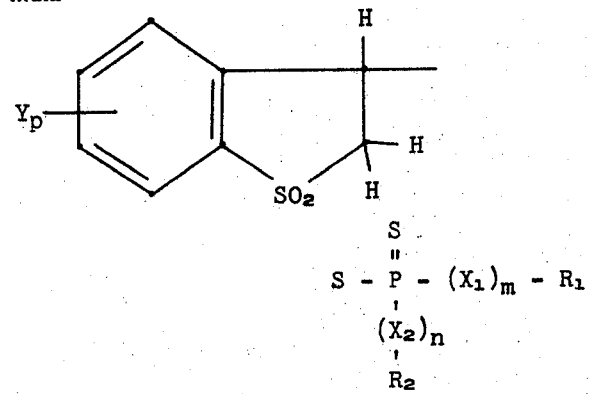

wherein each Y is independently selected from the group consisting of alkyl, halogen, alkoxy, haloalkyl, nitro, acyl, acyloxy, and acylamino; each X is oxygen or sulfur; $p$ is an integer from 0 to 3; $m$ is 0 or 1; $n$ is 0 or 1; $R_1$ and $R_2$ are independently selected from the group consisting of alkyl, haloalkyl, aryl, arylalkyl, alkoxyalkyl, aryloxyalkyl, and cycloalkyl; and $R_1$ and $R_2$ may form a ring, preferably containing 5 or 6 carbon atoms. The compounds of the above description are useful as insecticides.

7 Claims, No Drawings

S-(1,1-DIOXO-2,3-DIHYDRO-3-BENZOTHIENYL) PHOSPHOROTHIOATES

This invention relates to new chemical compounds of the following structural formula:

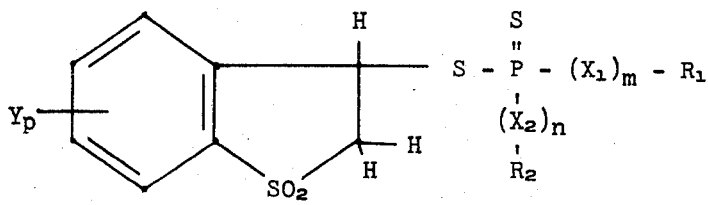

wherein each Y is independently selected from the group consisting of alkyl, halogen, alkoxy, haloalkyl, nitro, acyl, acyloxy, and acylamino; each X is oxygen or sulfur; $p$ is an integer from 0 to 3; $m$ is 0 or 1; $n$ is 0 or 1; $R_1$ and $R_2$ are independently selected from the group consisting of alkyl, haloalkyl, aryl, arylalkyl, alkoxyalkyl, aryloxyalkyl, and cycloalkyl; and $R_1$ and $R_2$ may form a ring, preferably containing 5 or 6 carbon atoms.

In a preferred embodiment of the present invention each Y is independently selected from the group consisting of lower alkyl, chlorine, bromine, lower alkoxy, lower chloroalkyl, nitro, acetyl, acetyloxy, and acetylamino; $X_1$ and $X_2$ are oxygen; $m$ and $n$ are 1; $R_1$ and $R_2$ are lower alkyl. The term "lower," as used herein, designates a straight or branched carbon chain containing a maximum of 10 carbon atoms.

The compounds of the present invention can be prepared by reacting a suitable benzothiophene dioxide with a suitable phosphorus acid containing the grouping PSSH. The specific reactants are selected on the basis of the desired substituents on the final product, since the substituents on the respective reactants will remain in the selected positions throughout the reaction. Thus the necessary reactants are:

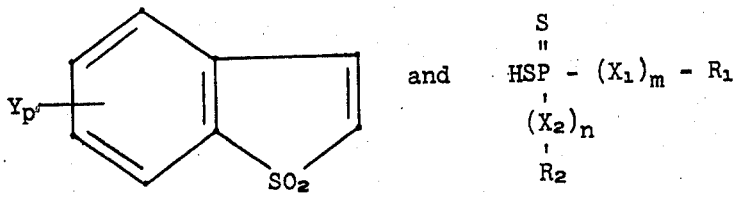

wherein X, Y, $R_1$, $R_2$, $m$, $n$, and $p$ are as heretofore defined.

This reaction proceeds conveniently in the absence of a solvent, or in an aromatic solvent, such as benzene or toluene, at about 80° to about 120°C for about 4 to 24 hours. The product can be obtained by extraction of acidic constituents in the reaction mixture with sodium hydroxide, sodium bicarbonate, or similar base, and evaporation of the solvent. The product can be purified by chromatography or crystallization.

The symmetrical O,O -dialkylphosphorodithioic acids required for the synthesis of the compounds of the present invention are generally prepared by the reaction of alcohols with phosphorus pentasulfide. Unsymmetrical esters may be prepared by the reaction of a higher alcohol with a symmetrical dialkyl ester or by the reaction of thiophosphoryl chloride with an alcohol followed by the reaction of the resulting O -alkyl dichlorothionophosphate with a second alcohol, and finally with sodium hydrosulfide. Esters of the other acids are prepared by analgous methods. Since dialkyl phosphorotetrathionic acids are unstable, no attempt is made to isolate them, but instead the crude reaction products of alkyl trithionometaphosphate with alkanethiols are used.

The benzothiophene 1-dioxides employed in the synthesis of the compounds of the present invention are generally prepared from the corresponding benzothiophenes by oxidation, for example, with an excess of hydrogen peroxide in acetic acid or acetic anhydride. The literature records a number of methods for the synthesis of benzothiophenes. One of these involves the reaction of styrenes or arylethanes with sulfur or hydrogen sulfide. Another method involves the cyclization of arylthioacetaldehyde acetals in the presence of polyphosphoric acid. Benzothiophene 1-dioxides can also be prepared by the cyclization of ω-styrylsulfonyl chlorides with aluminum chloride. (M. Peterson, Ph.D. Dissertation, Northwestern University, 1951.)

The following examples illustrate the preparation of the compounds of the present invention. The nomenclature used in naming the compounds within the scope of the heretofore described structural formula uses the terminology "benzothienyl" for the nucleus having the rings fused in the b position.

EXAMPLE 1

Preparation of
S-(1,1-Dioxo-2,3-dihydro-3-benzothienyl)
O,O-Dimethylphosphorodithioate Benzothiophene dioxide (8.3 g; 0.05 mol) and O,O-dimethylphosphorodithioic acid (15.8 g; 0.11 mol) were placed into a glass reaction flask equipped with reflux condenser, thermometer, and stirrer and containing benzene (100 ml). The mixture was heated to reflux and maintained at reflux with stirring for 24 hours. Then the mixture was cooled to room temperature. The cooled solution was diluted with diethylether and extracted with sodium hydroxide (8 g in a 10% solution). It was washed with water and dried with calcium chloride. After the calcium chloride was filtered, the ether then evaporated leaving a partially crystalline residue. The product thereof was crystallized twice from ethanol. After being washed with diethylether and air dried, the product had a melting point of 93°–96°C. Infrared analysis of a Nujol mull of this product had a strong absorption band at about 10 microns. The results of the elemental analysis of this product S-(1,1-dioxo-2,3-dihydro-3-benzothienyl) O,O-dimethylphosphorodithioate are as follows:

|  | C | H | P | S |
|---|---|---|---|---|
| Calculated | 37.03 | 4.04 | 9.55 | 29.65 |
| Found | 37.56 | 4.02 | 9.53 | 29.29 |

EXAMPLE 2

Preparation of
S-(1,1-Dioxo-2,3-dihydro-3-benzothienyl)
O,O-Diethylphosphorodithioate Benzothiophene dioxide (8.3 g; 0.05 mol) and O,O-diethylphosphorodithioic acid (10 g; 0.06 mol) were placed in a glass reaction flask equipped with reflux condenser, thermometer, and stirrer and containing toluene (100 cc). This mixture was cooled to a temperature of 10°C and allowed to warm up to room temperature over an 18 hour period with stirring. It was then heated on a steam bath for 4 hours and cooled to room temperature. The unreacted benzothiophene (3.5 g) which precipitated was removed by filtration. The filtrate was concentrated in a rotary evaporator on a steam bath under aspirator pressure and cooling gave crystals (3 g; mp 75°C). The product was crystallized from a benzene-heptane mixture (mp 71°–73°C). The results of the elemental analysis of this product S-(1,1-dioxo-2,3-dihydro-3-benzothienyl) O,O-diethylphosphorodithioate are as follows:

|  | C | H | P | S |
|---|---|---|---|---|
| Calculated | 40.90 | 4.86 | 8.79 | 27.29 |
| Found | 41.25 | 5.28 | 8.82 | 26.55 |

EXAMPLE 3

Preparation of
S-(1,1-Dioxo-2,3-dihydro-3-benzothienyl)
O,O-Diethylphosphorodithioate Benzothiophene dioxide (2 g) and 4 ml of crude O,O-diethylphosphorodithioic acid were mixed and heated on the steam bath in a loosely stoppered flask. Within one hour a homogeneous liquid was obtained, but the infrared spectrum still contained an SH band at 4.0 μ. After 18 hours this band had disappeared. The product was dissolved in ether and extracted with potassium carbonate solution, washed with water, and dried with anhydrous magnesium sulfate, filtered, evaporated on the steam bath, and cooled, giving a partially crystalline residue weighing 4.17 g, whose infrared spectrum was essentially the same as that of the product obtained in Example 2. Recrystallization from a mixture of benzene and heptane gave crystals melting at 70°–72°C.

EXAMPLE 4

Preparation of
S-(1,1-Dioxo-2,3-dihydro-3-benzothienyl)
O,O-Diethylphosphorodithioate Crude O,O-diethylphosphorodithioic acid was dissolved in potassium carbonate solution, extracted with ether, acidified, dried, and distilled at 68°–70°C/25 mm. This purified acid was treated with benzothiophene dioxide (2 g) in the same way as described for Example 3. The crude product weighed 3.57 g. After being crystallized the product S-(1,1-dioxo-2,3-dihydro-3-benzothienyl) O,O-diethylphosphorodithioate had a melting point of 71.5°–72.5°C.

EXAMPLE 5

Preparation of
S-(1,1-Dioxo-2,3-dihydro-5-tert-butyl-3-benzothienyl)
O,O-Diethylphosphorodithioate A solution of 5-tert butylbenzothiophene dioxide (6.68 g), and commercial O,O-diethyldithiophosphoric acid (10 g) in toluene (100 cc) was stirred at 10°C for one hour, warmed to room temperature, and left at room temperature without stirring for 12 days. During this period a liquid product precipitated from solution. Enough ether was added to give a clear yellow solution, which was extracted with sodium bicarbonate solution. It was washed with water, dried with anhydrous magnesium sulfate, filtered, and evaporated in a Buchler Flask Evaporator on the steam bath under aspirator pressure, leaving a viscous dark-amber liquid residue. The product S-(1,1-dioxo-2,3-dihydro-5-tert-butyl-3-benzothienyl) O,O-diethylphosphorodithioate was found to have a refractive index of $n_D^{25}$ 1.5618 and the following elemental analysis:

|  | C | H | P | S |
|---|---|---|---|---|
| Calculated | 47.3 | 5.46 | 7.63 | 23.7 |
| Found | 48.3 | 6.08 | 6.97 | 22.7 |

EXAMPLE 6

Preparation of
S-(1,1-Dioxo-2,3-dihydro-5-chloro-3-benzothienyl)
O,O-Diethylphosphorodithioate A solution of 5-chlorobenzothiophene dioxide (5 g) and commercial O,O-diethyldithiophosphoric acid (10 g) in benzene (100 cc) was left at room temperature for 3 days, extracted with potassium carbonate solution, and otherwise worked up as in Example 5. The solid portion of the residue (3.71 g) was found to be unreacted 5-chlorobenzothiophene dioxide.

The same quantities of the same reactants were heated on the steam bath for 20 hours and worked up as in Example 5, giving a clear yellow liquid product (8 g) having a refractive index of $n_D^{25}$ 1.5797. This product, S-(1,1-dioxo-2,3-dihydro-5-chloro-3-benzothienyl) O,O-diethylphosphorodithioate, had the following elemental analysis:

|  | C | H | Cl | P | S |
|---|---|---|---|---|---|
| Calculated | 37.3 | 4.17 | 8.91 | 8.01 | 24.9 |
| Found | 36.4 | 4.41 | 8.06 | 8.73 | 24.5 |

EXAMPLE 7

Preparation of
S-(1,1-Dioxo-2,3-dihydro-5-methyl-3-benzothienyl)
O,O-Diethylphosphorodithioate A solution of 5-methylbenzothiophene dioxide (5.40 g) and commercial O,O-diethyldithiophosphoric acid (10 g) in toluene (100 cc) was left 18 hours at room temperature, then heated on the steam bath for 4 hours, cooled, and worked up as in Example 5. The residue from the evaporation of the solvent was crystallized from a mixture of benzene and heptane, giving unreacted 5-methylbenzothiophene dioxide (2.5 g). Evaporation of the solvent from the mother liquor gave a yellow liquid residue (2.86 g) having a refractive index of $n_D^{25}$ 1.5754. This product, S-(1,1-dioxo-2,3-dihydro-5-methyl-3-benzothienyl) O,O-diethylphosphorodithioate, had the following elemental anaylsis:

|  | C | H | P | S |
|---|---|---|---|---|
| Calculated | 42.7 | 5.23 | 8.47 | 26.2 |
| Found | 43.2 | 5.25 | 8.80 | 26.0 |

EXAMPLE 8

Preparation of
S-(1,1-Dioxo-2,3-dihydro-6-methyl-3-benzothienyl) O,O-Diethylphosphorodithioate A solution of 6-methylbenzothiophene dioxide (5.40 g) and O,O-diethyldithiphosphoric acid (10.9 g) was heated on the steam bath for 20 hours, and worked up as described in Example 5, giving a viscous yellow liquid residue (10.35 g) having a refractive index of $n_D^{25}$ 1.5726. This product, S-(1,1-dioxo-2,3-dihydro-6-methyl-3-benzothienyl) O,O-diethylphosphorodithioate, had the following elemental anaylsis:

|  | C | H | P | S |
|---|---|---|---|---|
| Calculated | 42.7 | 5.23 | 8.47 | 26.2 |
| Found | 41.5 | 5.46 | 9.15 | 24.7 |

The following examples further illustrate the compounds of the present invention. Each example contains the reactants useful for preparing the desired compound. In each instance the procedures of the foregoing examples are used by substituting the identified reactants for the respective benzothiophene dioxide and dithiophosphoric acid.

EXAMPLE 9

Preparation of
S-(1,1-Dioxo-2,3-dihydro-5,6,7-trimethoxy-3-benzothienyl) O-Ethyl O-Dodecyl Phosphorodithioate 5,6,7-Trimethoxybenzothiophene 1-dioxide + O-ethyl O-dodecyl phosphorodithioic acid.

EXAMPLE 10

Preparation of
S-(1,1-Dioxo-2,3-dihydro-5-acetamido-6-bromo-3benzothienyl) O,O-Dibenzylphosphorodithioate 5-Acetamido-6-bromobenzothiophene 1dioxide + O,O-dibenzylphosphorodithioic acid.

EXAMPLE 11

Preparation of
2[1',1'-Dioxo-2',3'-dihydro-6'-benzamido-3'-benzothienylmercapto]-2-thiono-4-methyl-1,3,2-dioxaphospholane 6-Benzamidobenzothiophene 1-dioxide + 2-mercapto-2-thiono-4-methyl-1,3,2-dioxaphospholane.

EXAMPLE 12

Preparation of
S-(1,1-Dioxo-2,3-dihydro-4-bromo-5-methoxy-6-nitro-3-benzothienyl) O,O-Diphenylphosphorodithioate 4-Bromo-5-methoxy-6-nitrobenzothiophene 1-dioxide + O,O-diphenylphosphorodithioic acid.

EXAMPLE 13

Preparation of
S-(1,1-Dioxo-2,3-dihydro-4,6-diisopropyl-3-benzothienyl) O-Ethylbenzene-phosphonodithioate 4,6-Diisopropylbenzothiophene dioxide + O-ethylbenzenephosphonodithioic acid.

EXAMPLE 14

Preparation of
S-(1,1-Dioxo-2,3-dihydro-5,6,7-trimethoxy-3-benzothienyl) O-(2-Fluoroethyl)methanephosphonodithioate 5,6,7-Trimethoxybenzothiophene dioxide + O-(2-fluoroethyl)methanephosphonodithioic acid.

EXAMPLE 15

Preparation of
S-(1,1-Dioxo-2,3-dihydro-5,6-dichloro-3-benzothienyl) S-Methyl S-Ethyl Phosphorotetrathioate 5,6-Dichlorobenzothiophene dioxide + methyl trithiometaphosphate + ethanethiol (methyl ethyl phosphorotetrathioic acid).

EXAMPLE 16

Preparation of
S-(1,1-Dioxo-2,3-dihydro-4-bromomethyl-3-benzothienyl) O-Cyclohexylmethane-Phosphonodithioate 4-Bromomethylbenzothiophene 1-dioxide + O-cyclohexylmethanephosphonodithioic acid.

For practical use as insecticides, the compounds of this invention are generally incorporated into insecticidal compositions which comprise an inert carrier and an insecticidally toxic amount of such a compound. Such insecticidal compositions, which can also be called formulations, enable the active compound to be applied conveniently to the site of the insect infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. Frequently, solutions of insecticides can be dispersed under superatmospheric pressure as aerosols. However, preferred liquid insecticidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the insect infestation. The emulsifiers most commonly used in these concentrates are nonionic or mixtures of nonionic with anionic surface-active agents.

A typical insecticidal composition according to this invention is illustrated by the following example, in which the quantities are in parts by weight.

EXAMPLE 17

Preparation of a Dust

| | |
|---|---|
| Product of Example 1 | 10 |
| Powdered talc | 90 |

The above ingredients are mixed in a mechanical grinder-blender and are ground until a homogeneous, free-flowing dust of the desired particle size is obtained. This dust is suitable for direct application to the site of the insect infestation.

The compounds of this invention can be applied as insecticides in any manner recognized by the art. One method for destroying insects comprises applying to the locus of the insect infestation, an insecticidal composition comprising an inert carrier and, as the essential active ingredient, in a quantity which is toxic to said insects, a compound of the present invention. The concentration of the new compounds of this invention in the insecticidal compositions will vary greatly with the type of formulation and the purpose for which it is designed, but generally the insecticidal compositions will comprise from about 0.05 to about 95 percent by weight of the active compounds of this invention. In a preferred embodiment of this invention, the insecticidal compositions will comprise from about 5 to 75 percent by weight of the active compound. The compositions can also comprise such additional substances as other pesticides, stabilizers, spreaders, deactivators, adhesives, stickers, fertilizers, activators, synergists, and the like.

The compounds of the present invention are also useful when combined with other insecticides in the insecticidal compositions heretofore described. These other insecticides can comprise from about 5% to about 95% of the active ingredients in the insecticidal compositions. Use of the combinations of these other insecticides with the compounds of the present invention provide insecticidal compositions which are more effective in controlling insects and often provide results unattainable with separate compositions of the individual insecticides. The other insecticides with which the compounds of this invention can be used in the insecticidal compositions to control insects, can include halogenated compounds such as DDT, methoxychlor, TDE, lindane, chlordane, isobenzan, aldrin, dieldrin, heptachlor, endrin, mirex, endosulfan, dicofol, and the like; organic phosphorus compounds such as TEPP, schradan, ethion, parathion, methyl parathion, EPN, demeton, carbophenothion, phorate, zinophos, diazinon, malathion, mevinphos, dimethoate, DBD, ronnel, oxydemetonmethyl, dicapthon, chlorothion, phosphamidon, naled, fenthion, trichlorofon, DDVP, and the like; organic nitrogen compounds such as dinitro-o-cresol, dinitrocyclohexylphenol, DNB, DNP, binapacril, azobenzene, and the like; organic carbamate compounds such as carbaryl, ortho 5353, and the like; organic sulfur compounds such as phenothiazine, phenoxathin, lauryl thiocyanate, [bis-(2-thiocyanoethyl)ether], isobornyl thiocyanoacetate, and the like; as well as such substances usually referred to as fumigants, as hydrogen cyanide, carbon tetrachloride, calcium cyanide, carbon disulfide, ethylene dichloride, propylene dichloride, ethylene dibromide, ethylene oxide, methyl bromide, para-dichlorbenzene, and the like.

The compounds of the present invention can also be combined with fungicidal and nematocidal chemical compounds to form pesticidal compositions useful for the control of fungi and in some cases soil nematodes as well as insects. Typical examples of such fungicidal chemical compounds are ferbam, nabam, zineb, ziram, thiram, chloranil, dichlone, glyodin, cycloheximide, dinocap, maneb, captan, dodine, PCNB, -dimethylaminobenzene diazo sodium sulfonate, and the like; while examples of nematocidal compounds are chloropicrin, O,O-diethyl O-(2,4-dichlorophenyl) phosphorothioate, tetrachlorothiophene, dazomet, dibromochloropropane, and the like.

The new compounds of this invention can be used in many ways for the control of insects. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which can be effectively controlled by the compounds of the present invention are the chewing insects, such as the Mexican bean beetle and the southern armyworm; the piercing-sucking insects, such as the pea aphid, the cereal leaf beetle, the housefly, the grape leafhopper, the chinch bug, the lygus bug, the oyster shell scale, the California red scale, the Florida red scale, the soft scale and mosquitoes; the internal feeders, including borers, such as the European corn borer, the peach twig borer and the corn earworm, worms or weevils, such as the codling moth, the alfalfa weevil, the cotton boll weevil, the pink boll worm, the plum curculio, the red banded leaf roller, the melonworm, the cabbage looper and the apple maggot, leaf miners, such as the apple leaf miner, the birch leaf miner and the beet leaf miner, and gall insects such as the wheat joint worm and the grape phylloxera. Insects which attack below the surface of the ground are classified as subterranean insects and include such destructive pests as the wooly apple aphid, the Japanese beetle, the onion maggot and the corn rootworm.

Mites and ticks are not true insects. Many economically important species of the mites and ticks can be controlled by the compounds of this present invention, such as the red spider mite, the two-spotted mite, the strawberry spider mite, the citrus rust mite, the cattle tick, the poultry mite, the citrus red mite and the European red mite. Chemicals useful for the control of mites are often called miticides, while those useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

In order to demonstrate the insecticidal activity of the compounds of the present invention, a series of experiments was performed using the compounds of Examples 1 and 2 as representative of the present compounds and the southern armyworm, Mexican bean beetle and pea aphid as the insect species, as follows:

Ten-day old pea plants contained in small plastic pots were infested with ten adult pea aphids (*Acyrthosiphon pisum*). The plants and pea aphids were then sprayed with the test compound formulated as an aqueous emulsion of an acetone solution at the indicated concentrations. The infested plants were then placed in a holding chamber maintained at a constant temperature for a period of 48 hours. After this time the mortality of the aphids was determined on a percent basis, as follows:

| Test Compound | Conc (ppm) | % Control |
|---|---|---|
| S-(1,1-dioxo-2,3-dihydro-3-benzothienyl) O,O-dimethylphosphorodithioate | 1000 | 100 |
| | 400 | 100 |
| | 100 | 100 |
| | 40 | 100 |
| | 10 | 100 |
| | 4 | 79 |
| | 1 | 16 |
| S-(1,1-Dioxo-2,3-dihydro-3-benzothienyl) O,O-diethylphosphorodithioate | 1000 | 100 |
| | 400 | 100 |
| | 100 | 100 |
| | 40 | 100 |
| | 10 | 100 |
| | 4 | 11 |
| | 1 | 11 |

Then Henderson bush lima bean plants were dipped into acetone solutions of the test compounds diluted to the desired concentrations and were fed to 10 third instar Mexican bean beetle larvae for a feeding period of 48 hours. After this period the mortality was determined on a percent basis, as follows:

| Test Compound | Conc (ppm) | % Control |
|---|---|---|
| S-(1,1-Dioxo-2,3-dihydro-3-benzothienyl) O,O-dimethylphosphorodithioate | 1000 | 100 |
| | 400 | 100 |
| | 100 | 100 |
| | 40 | 37 |
| | 10 | 16 |
| S-(1,1-Dioxo-2,3-dihydro-3-benzothienyl) O,O-diethylphosphorodithioate | 1000 | 100 |
| | 400 | 100 |
| | 100 | 100 |
| | 10 | 100 |
| | 4 | 40 |

I claim:

1. A compound of the formula:

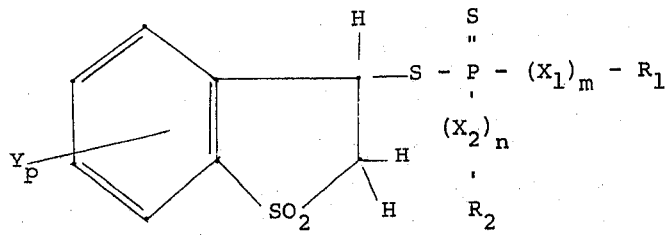

wherein each $y$ is independently selected from the group consisting of lower alkyl, halogen, lower alkoxy, lower chloroalkyl, nitro, acetyl, acetyloxy, and acetylamino; each $x$ is oxygen or sulfur; $p$ is an integer from 0 to 3; $m$ is 1; $n$ is 0 or 1; $R_1$ and $R_2$ are independently selected from the group consisting of lower alkyl, lower haloalkyl, benzyl, cyclohexyl, and phenyl 2. The compounds of claim 1 wherein $X_1$ and $X_2$ are oxygen.

3. The compound of claim 1, S-(1,1-dioxo-2,3-dihydro-3-benzothienyl) O,O-dimethylphosphorodithioate.

4. The compound of claim 1, S-(1,1-dioxo-2,3-dihydro-3-benzothienyl) O,O-diethylphosphorodithioate.

5. The compound of claim 1, S-(1,1-dioxo-2,3-dihydro-5-tert-butyl-3-benzothienyl) O,O-diethylphosphorodithioate.

6. The compound of claim 1, S-(1,1-dioxo-2,3-dihydro-5-chloro-3-benzothienyl) O,O-diethylphosphorodithioate.

7. The compound of claim 1, S-(1,1-dioxo-2,3-dihydro-5-methyl-3-benzothienyl) O,O-diethylphosphorodithioate.

* * * * *